(12) United States Patent
Kawai et al.

(10) Patent No.: US 8,164,639 B2
(45) Date of Patent: Apr. 24, 2012

(54) DRIVING APPARATUS AND IMAGE PICKUP APPARATUS USING THE SAME

(75) Inventors: Sumio Kawai, Hachioji (JP); Yoshiki Nishihara, Hachioji (JP); Mitsuhiro Haga, Hidaka (JP)

(73) Assignee: Olympus Imaging Corp. (JP)

( * ) Notice: Subject to any disclaimer, the term of this patent is extended or adjusted under 35 U.S.C. 154(b) by 341 days.

(21) Appl. No.: 12/622,707

(22) Filed: Nov. 20, 2009

(65) Prior Publication Data

US 2010/0157074 A1    Jun. 24, 2010

(30) Foreign Application Priority Data

Dec. 24, 2008 (JP) ................... 2008-328152

(51) Int. Cl.
*H04N 5/228* (2006.01)
(52) U.S. Cl. ............. 348/208.7; 348/208.99; 348/208.2; 348/208.4
(58) Field of Classification Search ............. 348/208.99, 348/208.1, 208.2, 208.3, 208.4, 208.5, 208.6, 348/208.7, 208.12, 208.13, 208.16, 373, 348/374, 375
See application file for complete search history.

(56) References Cited

U.S. PATENT DOCUMENTS

| | | | | |
|---|---|---|---|---|
| 6,064,827 | A * | 5/2000 | Toyoda | 396/55 |
| 7,973,855 | B2 * | 7/2011 | Shirono | 348/374 |
| 2008/0049109 | A1 * | 2/2008 | Teramoto et al. | 348/208.7 |
| 2008/0145042 | A1 | 6/2008 | Kawai et al. | 396/55 |
| 2008/0151065 | A1 * | 6/2008 | Okumura et al. | 348/208.4 |
| 2009/0002502 | A1 * | 1/2009 | Shirono | 348/208.99 |

FOREIGN PATENT DOCUMENTS

| | | |
|---|---|---|
| JP | 2008-172995 | 7/2008 |
| JP | 2008-220031 | 9/2008 |

OTHER PUBLICATIONS

Extended European Search Report dated Feb. 15, 2010 issued in corresponding European Patent Application No. 09014696.0.

* cited by examiner

*Primary Examiner* — David Ometz
*Assistant Examiner* — Peter Chon
(74) *Attorney, Agent, or Firm* — Ostrolenk Faber LLP

(57) ABSTRACT

A driving apparatus includes: a first member including a first linear groove; a second member including a second linear groove; a plurality of first rolling bodies held between the first and the second linear grooves; a pressing member for pressing the first and second members; a pressing force applying member for pressing the pressing member; and second rolling bodies arranged on the same plane between the second member and the pressing member. A third linear groove for guiding the second rolling bodies is formed on one of the second member and the pressing member. At least one or more of the second rolling bodies are arranged on both sides of the central axis of the first rolling bodies, and the pressing force applying member applies a pressing force to the second rolling bodies such that rotational moment around the axis line is zero.

6 Claims, 12 Drawing Sheets

DRIVING APPARATUS AND IMAGE PICKUP APPARATUS USING THE SAME

This Application claims benefit of Japanese Application No. 2008-328152 filed in Japan on Dec. 24, 2008, the contents of which are incorporated by this reference.

BACKGROUND OF THE INVENTION

1. Field of the Invention

The present invention relates to a driving apparatus and an image pickup apparatus using the driving apparatus, and more particularly to a driving apparatus that moves a movable body in a predetermined direction with respect to a fixed body using a driving force of an actuator such as an electromagnetic motor, or an ultrasonic motor, and an image pickup apparatus such as a digital camera equipped with an image shake correction mechanism for correcting image shake by using the driving apparatus.

2. Description of the Related Art

In recent years, image pickup apparatuses such as digital cameras which include an image shake correction mechanism are put into practical use and widely used. In such an image shake correction mechanism, image shake correction is performed using a driving apparatus that appropriately moves a movable body equipped with an image pickup device and the like in a predetermined direction at a predetermined timing with respect to a fixed body by means of a driving force of an actuator such as an electromagnetic motor, an ultrasonic motor, or the like.

As an image shake correction mechanism applied to a conventional image pickup apparatus, such a mechanism is known in which shake vibration in a pitch direction and shake vibration in a yaw direction of the image pickup apparatus are detected using shake detecting means such as an angular velocity sensor, and based on a detected shake signal, a part of photographing optical system or the image pickup device is moved independently in a horizontal direction and in a vertical direction within a plane perpendicular to an optical axis of the photographing optical system to cancel an image shake, thereby correcting the image shake of an optical image formed on an image pickup surface of the image pickup device.

Such an image shake correction mechanism includes a driving apparatus which moves optical elements (lenses) as a part of photographing optical system or the image pickup device in a horizontal direction and in a vertical direction within the plane perpendicular to the optical axis of the photographing optical system.

The driving apparatus is required to be capable of performing very precise driving (minute driving) so as to cause the image shake correction mechanism to follow image shake. When the image shake correction mechanism is driven by the driving apparatus, the driving apparatus is required to have a configuration and precision for accurately determining a position of a movable body, i.e., a position of an image pickup surface with respect to the photographing optical system. Furthermore, in order to drive the image shake correction mechanism by the driving apparatus, the driving apparatus is required to have a large amount of driving force to overcome the gravity of the movable body and obtain acceleration necessary for controlling the image shake correction mechanism. In addition, when the power is turned off, the driving apparatus is required to have a self-retaining property to retain the position of the movable body at a predetermined position. In addition to these conditions, it is needless to say that the image shake correction mechanism using the driving apparatus is preferably a size-reduced and inexpensive mechanism.

For example, Japanese Patent Application Laid-Open Publication No. 2008-172995 and the like propose various kinds of image shake correction mechanisms using conventional driving apparatuses.

A driving apparatus disclosed in the Japanese Patent Application Laid-Open Publication No. 2008-172995 includes a sliding body arranged in a movable body, a transducer which vibrates by contacting the sliding body and is retained in a fixed body, and a plurality of rolling bodies arranged between the sliding body and the fixed body.

Specifically, the rolling bodies (balls) are arranged between a linear V-groove formed on a fixed body (frame or X-frame) and a linear V-groove formed on a movable body (X-frame or Y-frame), for example, which configures a guide portion for defining the moving direction of the movable body in the direction along the both linear V-grooves and guiding the movable body in the same direction. An ultrasonic actuator which generates elliptical vibration on a surface thereof is disposed on the sliding plate side of the movable body in the guide portion in a pressed manner. The movable body is driven in the rotational direction of the elliptical vibration generated by driving the ultrasonic actuator.

The guide portion is arranged on a region closer to one end of the movable body itself, and the ultrasonic actuator is arranged, pressed against the movable body side of the guide portion. In this case, the pressing force of the ultrasonic actuator is applied to the fixed body (frame or X-frame) through the movable body in a direction perpendicular to an axis line connecting the centers of the rolling bodies of the guide portion.

Accordingly, in order to secure a balance of the pressing state with respect to the movable body itself, an elastic member such as a spring, which applies a biasing force in a direction perpendicular to the axis line connecting the centers of the rolling bodies of the guide portion, is arranged on the region closer to the other end of the movable body.

SUMMARY OF THE INVENTION

A driving apparatus of the present invention is a driving apparatus for moving a movable body with a driving force of a driving source which includes: a first member including a first linear groove; a second member including a second linear groove on one surface opposed to the first linear groove, the second member being arranged so as to be movable with respect to the first member; a plurality of first rolling bodies which are held between the first linear groove and the second linear groove and which are linearly arranged spaced a predetermined distance apart from one another; a pressing member for pressing the first member and the second member from a direction perpendicular to an axis line connecting centers of the plurality of first rolling bodies; a pressing force applying member for applying a pressing force to the pressing member; and a plurality of second rolling bodies arranged spaced at a predetermined distance apart from one another on the same plane, between the second member and the pressing member, wherein a plurality of third linear grooves for guiding the plurality of second rolling bodies are formed on either one of the second member or the pressing member, the plurality of second rolling bodies are arranged such that, when an axis line connecting the centers of the plurality of first rolling bodies is projected on a plane which is the same plane on which the plurality of second rolling bodies are arranged, at least one or more of the plurality of second rolling bodies are located on both sides opposed to each other with the axis line sandwiched therebetween within the plane, and the pressing force applying member applies a pressing force to the plurality of second rolling bodies through the pressing member such that a rotational moment around the axis line becomes zero.

Advantages of the present invention will be more apparent from the following detailed description.

DETAILED DESCRIPTION OF THE PREFERRED EMBODIMENT

Description is made on one embodiment of the present invention taking, as an example, a driving apparatus that executes image shake correction operation by driving an image pickup unit including an image pickup device for performing photoelectrical conversion processing and obtaining image signals, and an image pickup apparatus equipped with an image shake correction mechanism using the driving apparatus. As the image pickup apparatus, a lens interchangeable single-lens reflex digital camera is exemplified in the present embodiment.

Figure 1:
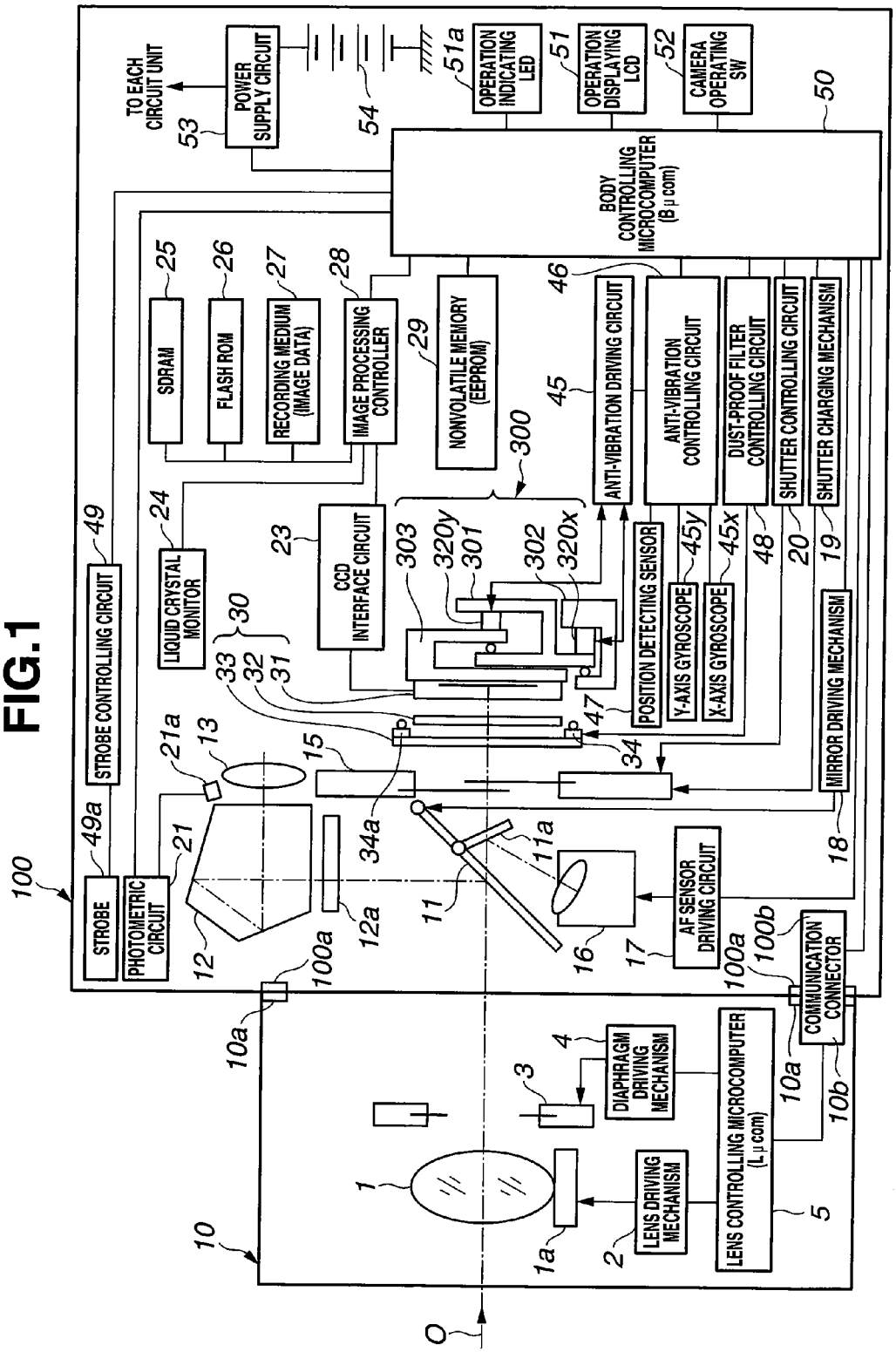
FIG. 1 is a block configurational diagram showing an internal configuration of an image pickup apparatus including a driving apparatus according to one embodiment of the present invention, which mainly shows a simple overview of an electric configuration.
Figure 2:
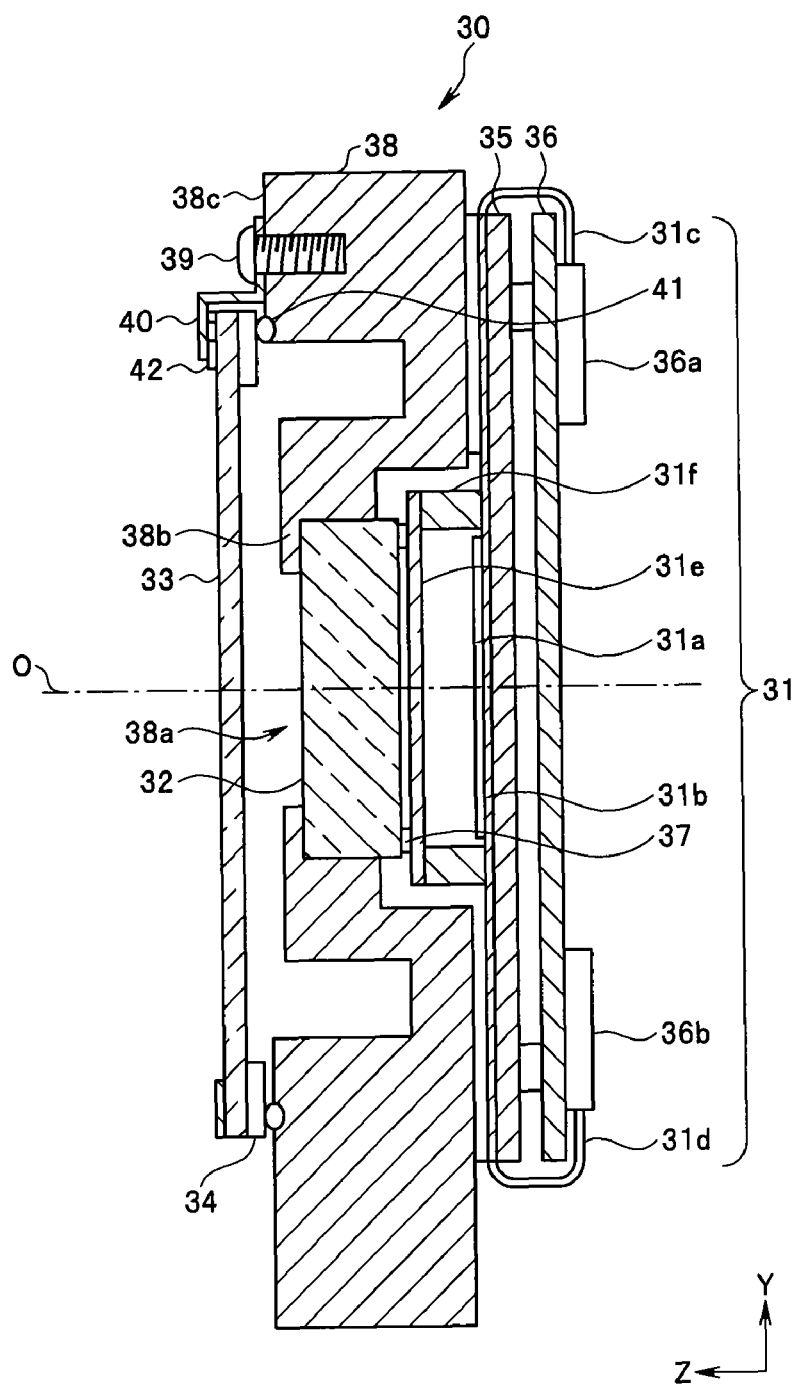
FIG. 2 is a longitudinal sectional side view showing a configuration of an image pickup unit in the image pickup apparatus in FIG. 1.
Figure 3:
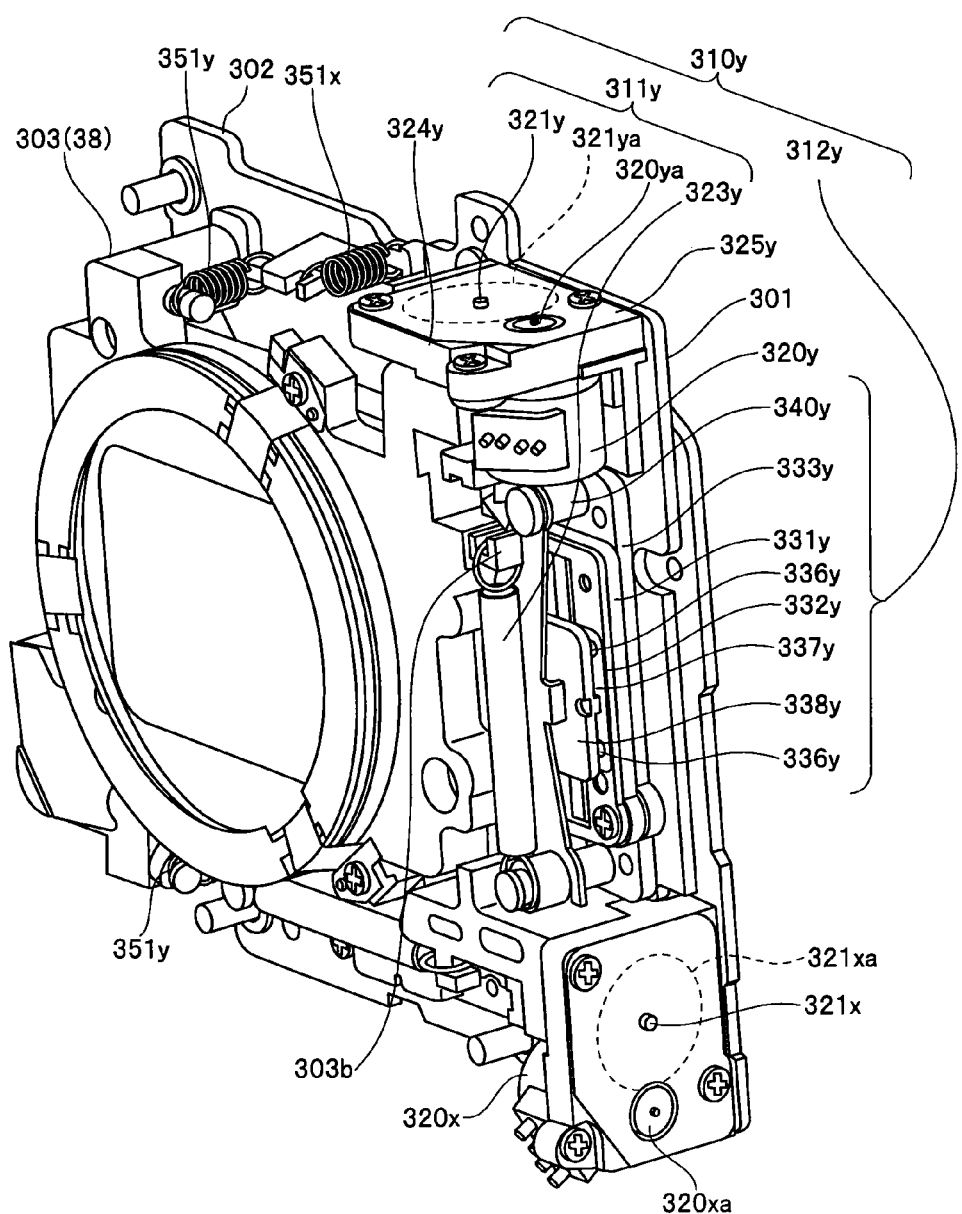
FIG. 3 is a main-part enlarged perspective view showing by extracting an image shake correction mechanism (anti-vibration unit) including the driving apparatus used in the image pickup apparatus in FIG. 1.
Figure 4:
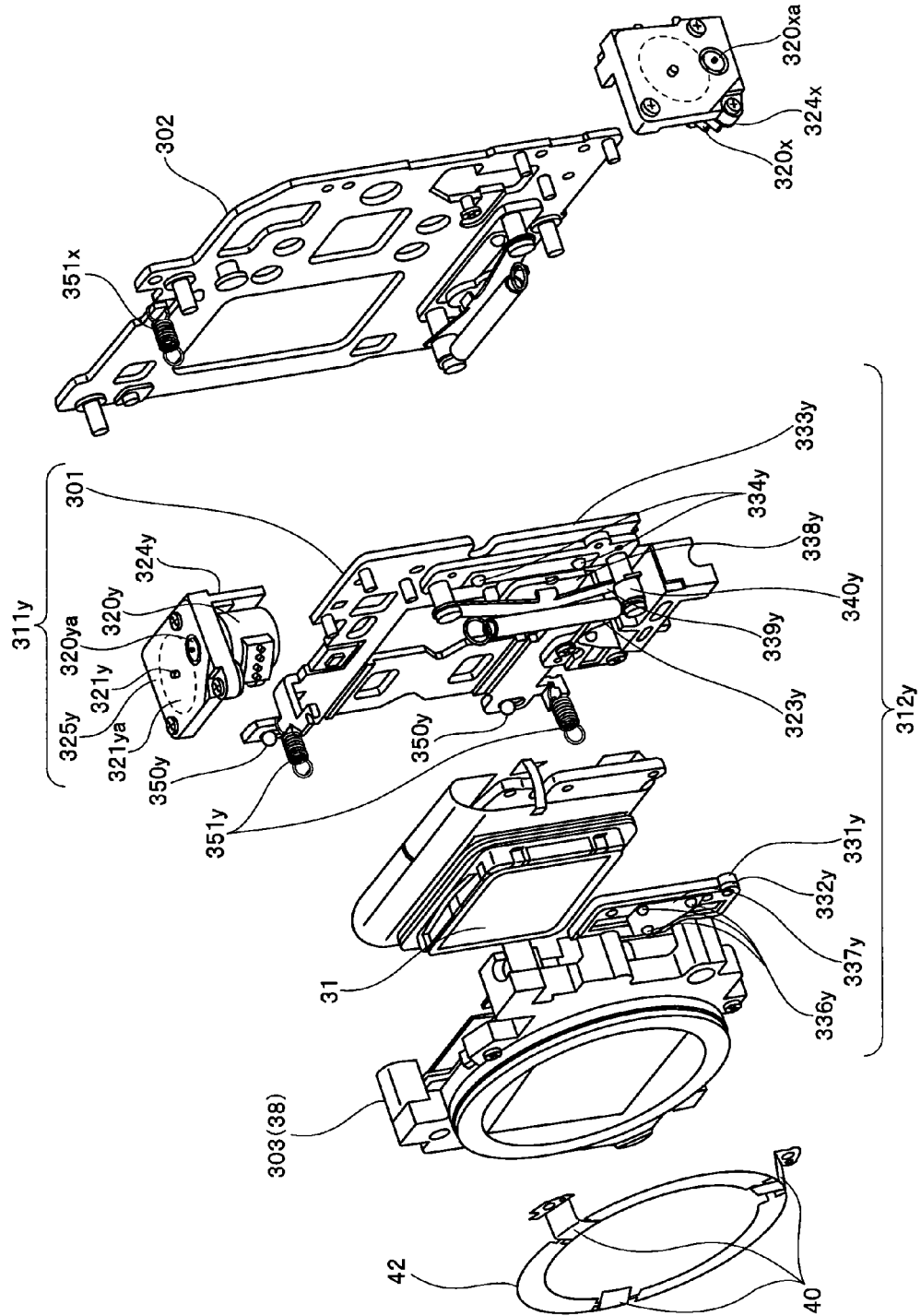
FIG. 4 is an exploded perspective view showing the image shake correction mechanism (anti-vibration unit) in FIG. 3 in an exploded manner.
Figure 5:
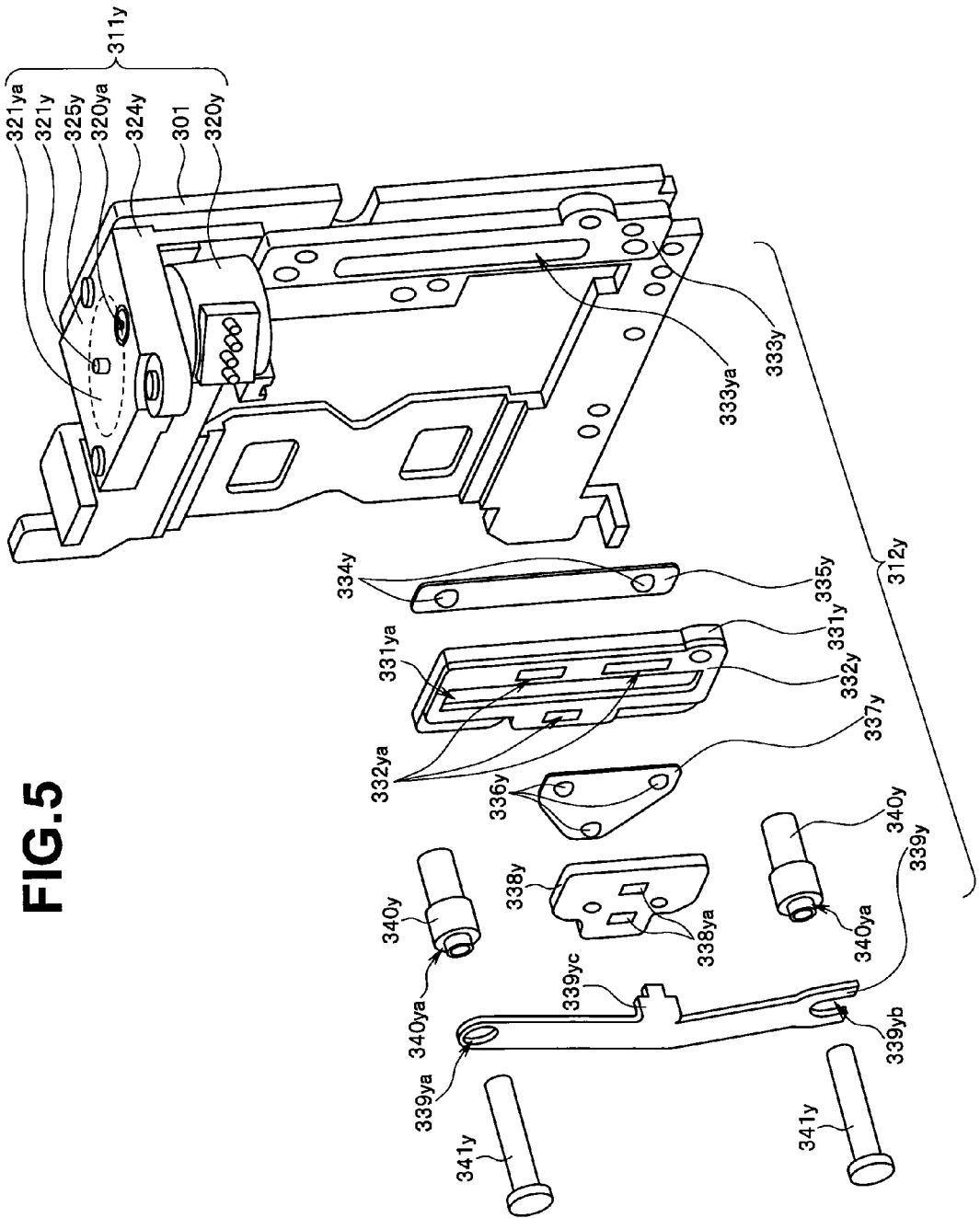
FIG. 5 is a main-part enlarged exploded perspective view showing components related to a guide portion by extracting them from the driving apparatus of the image shake correction mechanism (anti-vibration unit) in FIG. 3.
Figure 6:
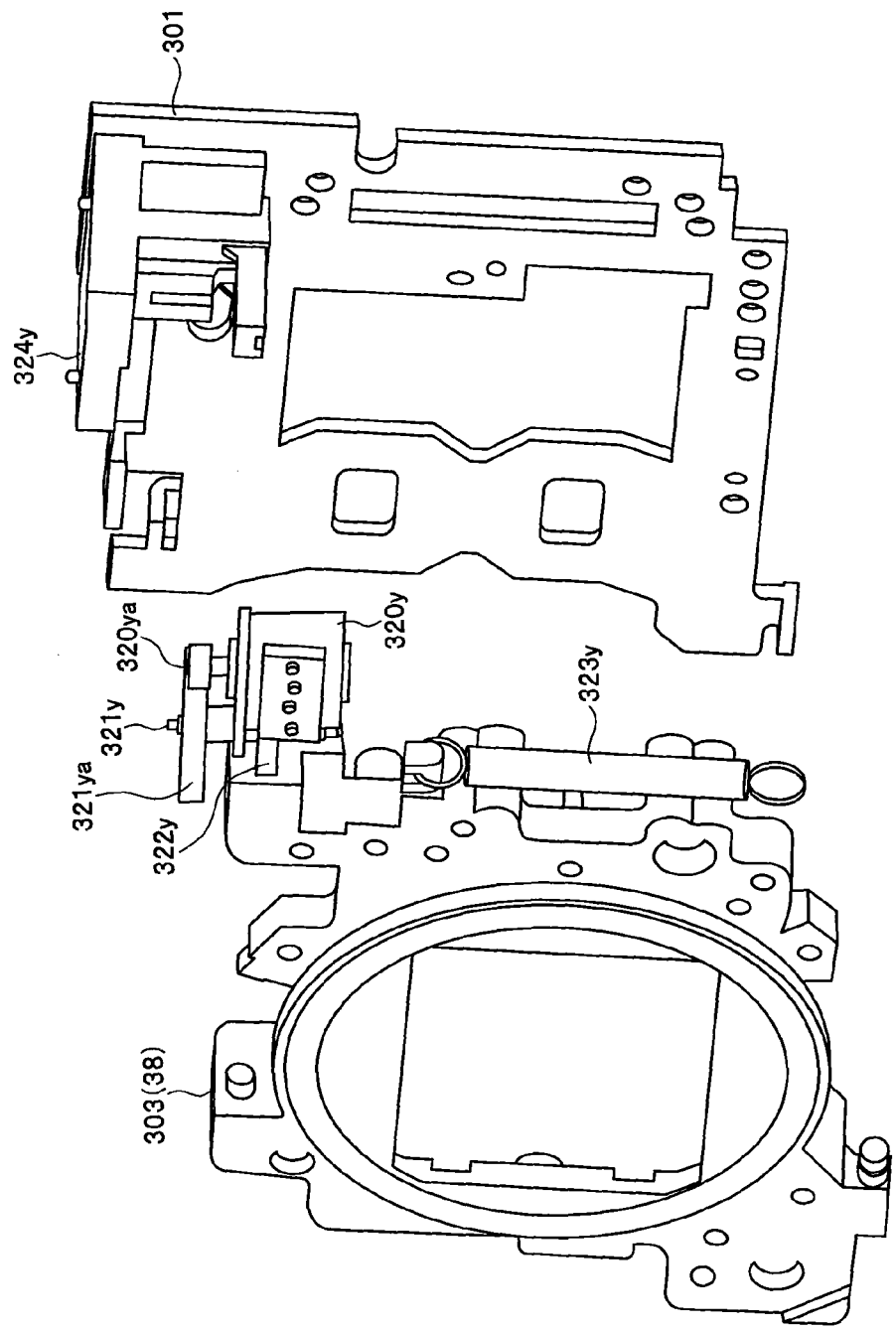
FIG. 6 is a main-part enlarged exploded perspective view showing components related to a driving portion by extracting them from the driving apparatus of the image shake correction mechanism (anti-vibration unit) in FIG. 3.
Figure 7:
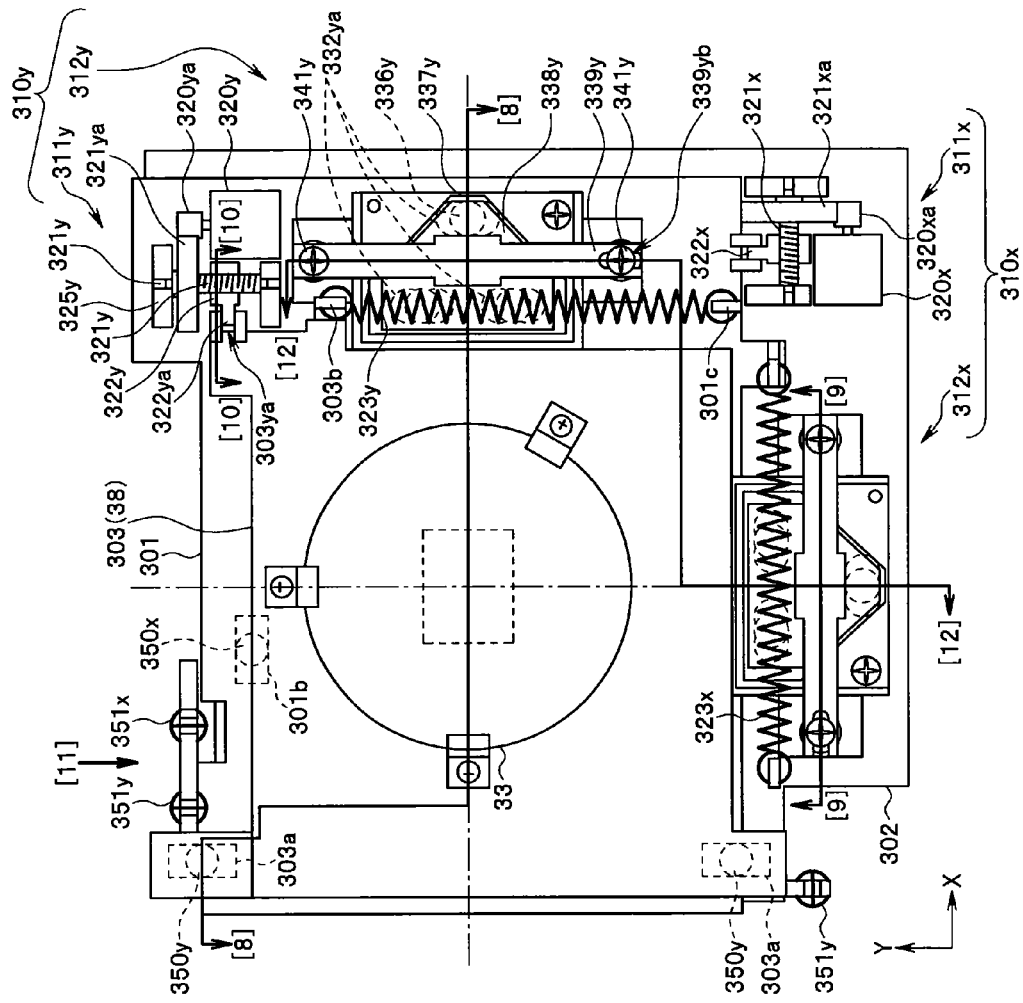
FIG. 7 is a front view showing a simple overview of the image shake correction mechanism (anti-vibration unit) in FIG. 3.
Figure 8:
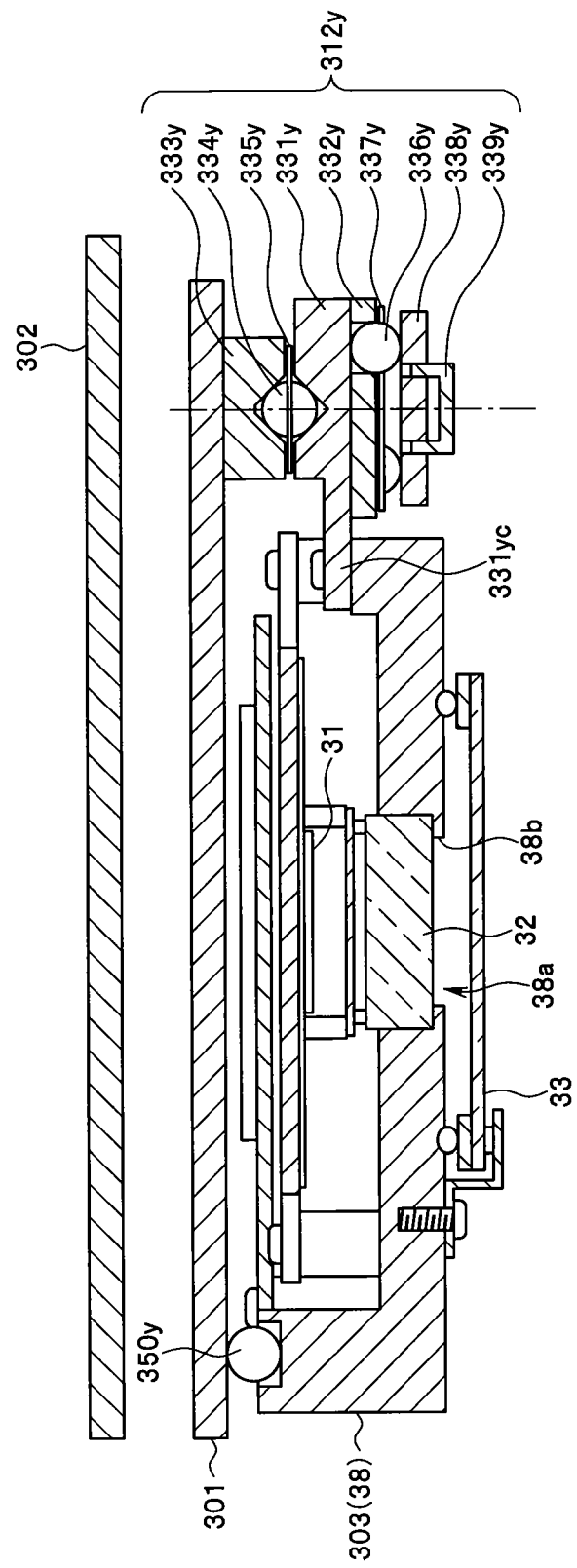
FIG. 8 is a cross-sectional view taken along the line [8]-[8] in FIG. 7.
Figure 9:
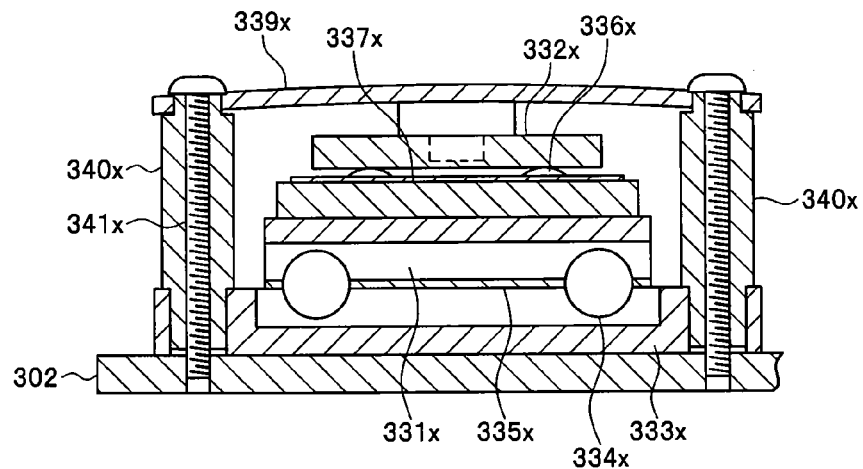
FIG. 9 is a cross-sectional view taken along the line [9]-[9] in FIG. 7.
Figure 10:
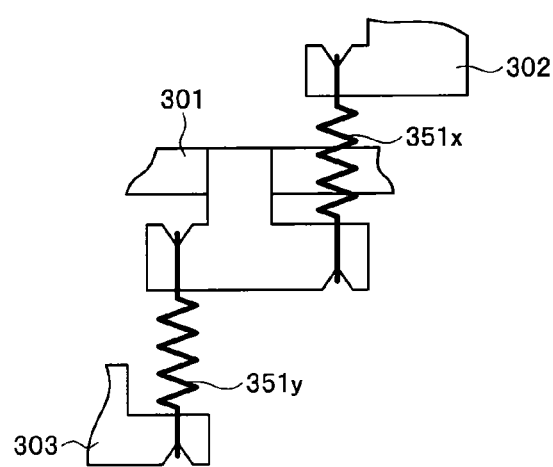
FIG. 10 is an arrow view in the [11] direction in FIG. 7.
Figure 11:
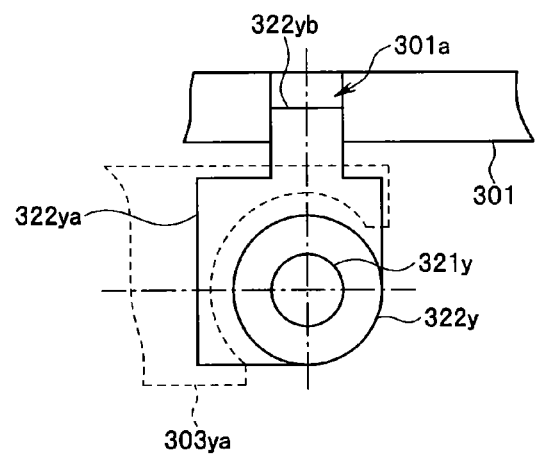
FIG. 11 is a cross-sectional view taken along the line [10]-[10] in FIG. 7.
Figure 12:
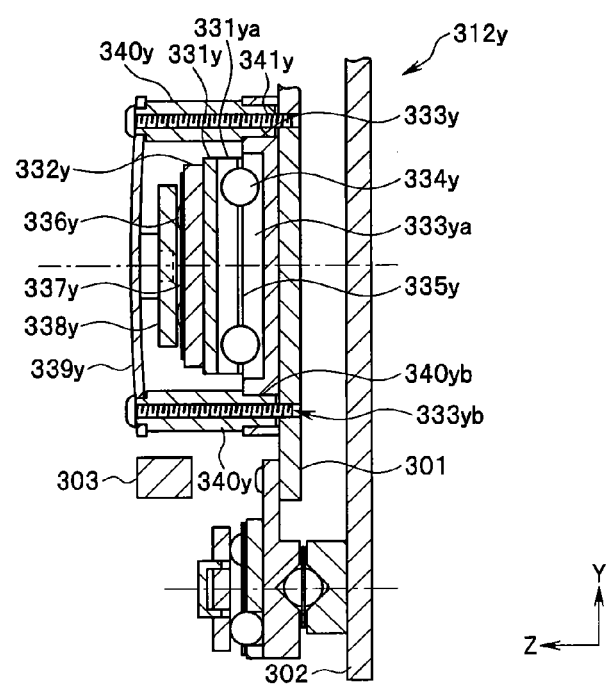
FIG. 12 is a cross-sectional view taken along the line [12]-[12] in FIG. 7.
Figure 13:
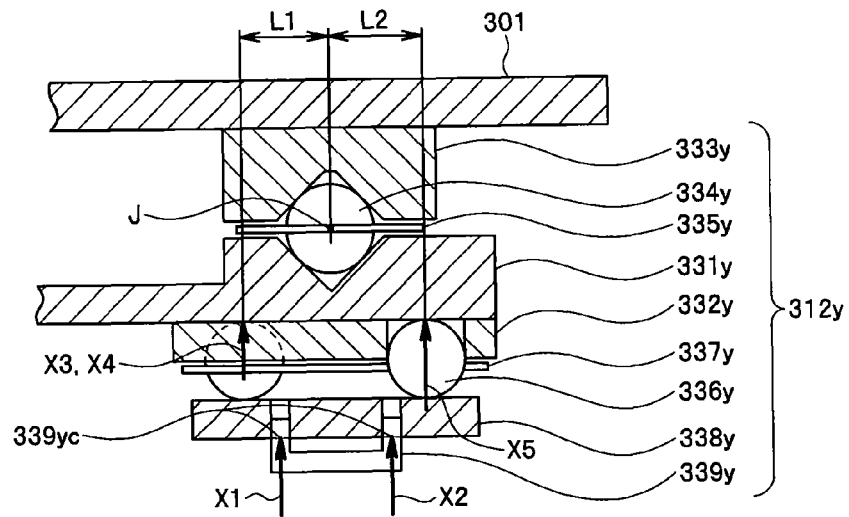
FIG. 13 is a main-part enlarged cross-sectional view showing in an enlarged manner a part of the cross section taken along the line [8]-[8] in FIG. 7, which schematically shows the guide portion in a normal state.
Figure 14:
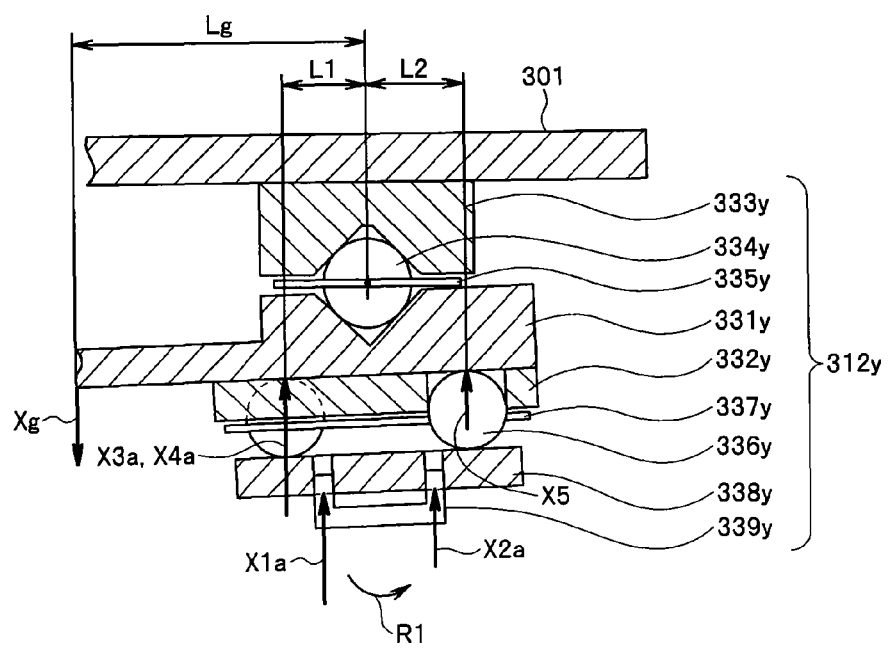
FIG. 14 is a main-part enlarged cross-sectional view showing in an enlarged manner a part of the cross section taken along the line [8]-[8] in FIG. 7, which schematically shows the guide portion in a case where an external force is applied to an end portion of a Y-frame.
Figure 15:
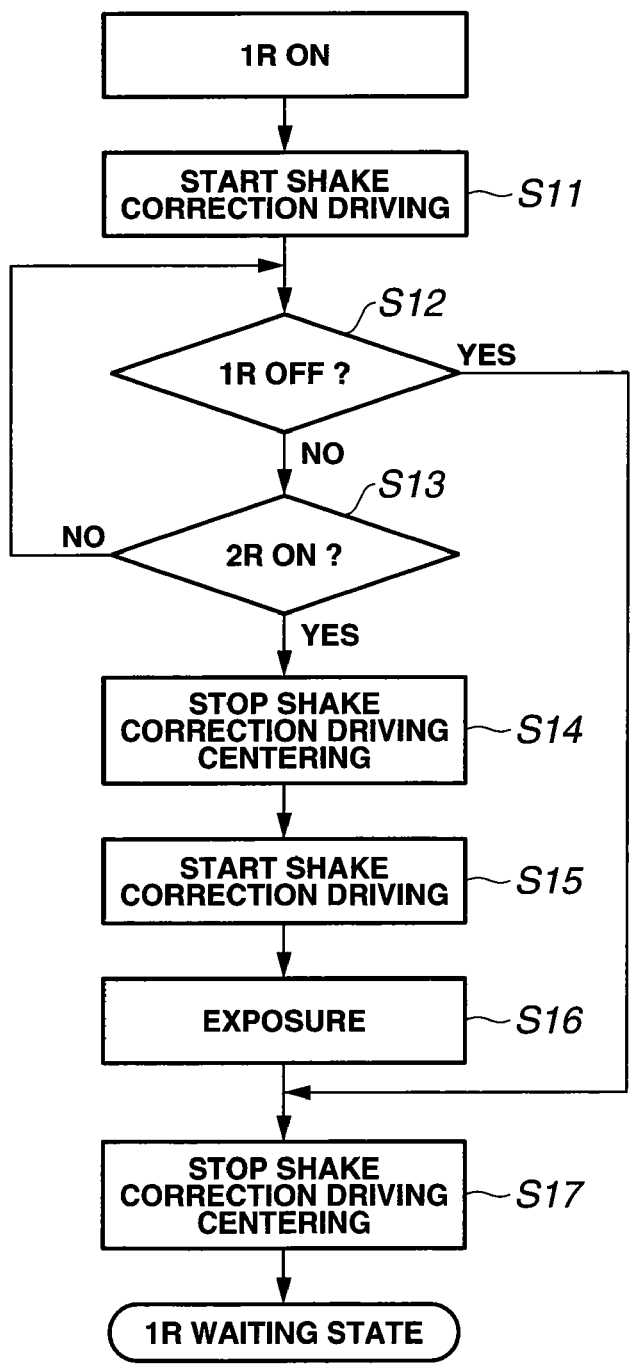
FIG. 15 is a flowchart showing a simple overview of an image shake correction operation at the time of photographing still images which is a part of operation sequence of the image pickup apparatus using the driving apparatus according to one embodiment of the present invention.

FIG. 1 is a block configurational diagram showing an internal configuration of an image pickup apparatus including the driving apparatus according to one embodiment of the present invention, which mainly shows a simple overview of an electric configuration. FIG. 2 is a longitudinal sectional side view showing a configuration of the image pickup unit in the image pickup apparatus in FIG. 1. FIG. 3 is a main-part enlarged perspective view showing by extracting the image shake correction mechanism (anti-vibration unit) including the driving apparatus used in the image pickup apparatus in FIG. 1. FIG. 4 is an exploded perspective view showing the image shake correction mechanism (anti-vibration unit) in FIG. 3 in an exploded manner. FIG. 5 is a main-part enlarged exploded perspective view showing components related to a guide portion by extracting them from the driving apparatus of the image shake correction mechanism (anti-vibration unit) in FIG. 3. FIG. 6 is a main-part enlarged exploded perspective view showing components related to a driving portion by extracting them from the driving apparatus of the image shake correction mechanism (anti-vibration unit) in FIG. 3. FIG. 7 is a front view showing a simple overview of the image shake correction mechanism (anti-vibration unit) in FIG. 3. FIG. 8 is a cross-sectional view taken along the line [8]-[8] in FIG. 7. FIG. 9 is a cross-sectional view taken along the line [9]-[9] in FIG. 7. FIG. 10 is an arrow view in the [11] direction in FIG. 7. FIG. 11 is a cross-sectional view taken along the line [10]-[10] in FIG. 7. FIG. 12 is a cross-sectional view taken along the line [12]-[12] in FIG. 7. FIGS. 13 and 14 are main-part enlarged cross-sectional views showing in an enlarged manner a part of the cross section taken along the line [8]-[8] in FIG. 7. FIG. 13 schematically shows the guide portion in a normal state. FIG. 14 schematically shows the guide portion in a case where an external force is applied to an end portion of a Y-frame. FIG. 15 is a flowchart showing a simple overview of an image shake correction operation at the time of photographing still images which is a part of operation sequence of the image pickup apparatus using the driving apparatus according to the present embodiment.

First, description will be made below on the simple overview of the internal configuration of the image pickup apparatus which uses the driving apparatus according to one embodiment of the present invention with reference to FIG. 1.

The image pickup apparatus (hereinafter, referred to as a camera) using the driving apparatus according to the present embodiment includes a body unit 100 as a camera main body, and a lens unit 10 as an interchangeable lens which is one of accessory apparatuses.

The lens unit 10 includes: a photographing lens 1 as an optical element that forms an optical image; a lens frame 1a that holds the photographing lens 1; a lens driving mechanism 2 that advances and retracts the lens frame 1a in a direction along the optical axis O; a diaphragm 3 that adjusts an amount of light incident on the photographing lens 1; a diaphragm driving mechanism 4 that drives the diaphragm 3; a lens controlling microcomputer (hereinafter Lµcom) 5 that controls the lens unit 10; a communication connector 10b; and a lens mount 10a.

The lens unit 10 is attachable and detachable to and from the body unit 100 through joint between the lens mount 10a and a mount portion 100a arranged on the front surface of the body unit 100.

The communication connector 10b is electrically connected with the Lμcom 5. When the lens unit 10 is mounted to the body unit 100, the communication connector 10b of the lens unit 10 is electrically connected with a communication connector 100b (to be described later) of the body unit 100. As described later, the communication connector 100b is electrically connected with a body controlling microcomputer (hereinafter Bμcom) 50 of the body unit 100. Accordingly, when the lens unit 10 and the body unit 100 are coupled with each other, the Lμcom 5 and the Bμcom 50 are electrically connected to each other, and the Lμcom 5 and the Bμcom 50 cooperatively control the camera as a system.

Note that, in this state, the Lμcom 5 of the lens unit 10 is configured to operate subserviently in cooperation with the Bμcom 50 under the control of Bμcom 50, thereby controlling the lens unit 10.

The Lμcom 5 is electrically connected with the lens driving mechanism 2 and diaphragm driving mechanism 4.

The lens driving mechanism 2 includes a lens driving source such as a DC motor for advancing and retracting the lens frame 1a in the direction along the optical axis O at a predetermined timing, and a lens driving force transmission mechanism for transmitting a driving force from the lens driving source. In addition, the diaphragm driving mechanism 4 includes a diaphragm driving source such as a stepping motor for driving the diaphragm 3 at a predetermined timing, and a diaphragm driving force transmission mechanism for transmitting a driving force from the diaphragm driving source.

The lens driving mechanism 2 and the diaphragm driving mechanism 4 are driven and controlled by the Lμcom 5 based on the control from the Bμcom 50.

The body unit 100 includes the Bμcom 50 which controls the entire camera in a centralized manner, and various kinds of components including: components (a quick return mirror 11, a pentaprism 12, a focusing screen 12a, an eyepiece 13, a mirror driving mechanism 18, and the like) of a single-lens reflex finder optical system; components (a sub-mirror 11a, an AF sensor unit 16, an AF sensor driving circuit 17, and the like) for implementing a TTL phase-difference detection auto focus function; components (a shutter unit 15, a shutter charging mechanism 19, a shutter controlling circuit 20, and the like) of a focal plane shutter mechanism which is arranged on the optical axis O of the photographing lens 1 and controls exposure at the time of photographing operation; components (a photometric sensor 21a, a photometric circuit 21, and the like) for implementing a photometric function by detecting a luminous flux entering from the photographing lens 1 to pass through the finder optical system; components (a strobe light emitting portion 49a, a strobe controlling circuit 49, and the like) of a flush light emitting apparatus for irradiating photographing auxiliary light; components (an image pickup unit 30, a CCD interface circuit 23, an image processing controller 28, an SDRAM 25, a flash ROM 26, a recording medium 27, a nonvolatile memory 29, a liquid crystal monitor 24, and the like) of an image pickup system and image recording/displaying system which are arranged on the optical axis O of the photographing lens 1 so as to be located behind the shutter mechanism and which implement an image pickup function and an image recording/displaying function by photoelectrically converting an optical image formed by the photographing lens 1 to obtain an electronic image signal and by performing various kinds of processings on the obtained electronic image signal; components (an X-frame 301, a frame 302, a Y-frame 303, an X-axis actuator 320x, a Y-axis actuator 320y, an anti-vibration driving circuit 45, an X-axis gyroscope 45x, a Y-axis gyroscope 45y, an anti-vibration controlling circuit 46, a position detecting sensor 47 and the like) of an anti-vibration unit which includes the image pickup unit 30 integrally mounted thereto and performs control for moving the image pickup unit 30 in a predetermined direction at a predetermined timing within a surface perpendicular to the optical axis O of the photographing lens 1 to configure an image shake correction mechanism; an operation displaying LCD 51 and an operation indicating LED 51a; a camera operating SW 52 which includes various kinds of operation members and generates electric signals according to operation instructions in association with the operation members; a power supply battery 54; and a power supply circuit 53.

The image pickup unit 30 includes, as an integrated unit, an image pickup device (hereinafter, referred to as CCD) 31 as a photoelectric conversion device, an optical low-pass filter (LPF) 32 disposed on the front surface of the image pickup device 31, and a dust-proof unit including a dust-proof filter 33.

The dust-proof unit is configured of the dust-proof filter 33, a piezoelectric device 34, a dust-proof filter controlling circuit 48 which is electrically connected to the piezoelectric device 34, and the like.

The piezoelectric device 34 has two electrodes. The two electrodes are energized by the dust-proof filter controlling circuit 48 to vibrate the piezoelectric device 34 at a predetermined frequency, thereby enabling the dust-proof filter 33 to vibrate.

The dust-proof unit thus vibrates the dust-proof filter 33 arranged in front of the CCD 31, thereby capable of removing dust and the like adhered on a surface of the dust-proof filter 33.

The SDRAM 25 is an area for temporarily storing image signals which operate a control program and the like of the camera and which are to be signal-processed. In addition, the SDRAM 25 is a memory area as a work area for various signal processings.

The recording medium 27 is composed of semiconductor memory such as various memory cards, a magnetic recording medium such as an HDD, and is an external recording medium fixed to or detachably attached to the body unit 100. In the recording medium 27 are recorded image data and the like obtained by photographing operation of the camera.

The nonvolatile memory 29, such as an EEPROM, is a memory area for storing in advance various control parameters to be needed for controlling the camera.

The image processing controller 28 controls the CCD interface circuit 23 according to the instruction from the Bμcom 50 and captures image data outputted from the CCD 31. The image data is converted into a video signal in the image processing controller 28 to be outputted on the liquid crystal monitor 24. Then, the photographed image obtained by the CCD 31 is displayed on a display screen of the liquid crystal monitor 24.

In addition, the operation displaying LCD 51 and the operation indicating LED 51a display and notify the operation state of the camera under the control of the Bμcom 50.

The camera operating SW 52 is a switch group including a plurality of operation members necessary for operating the camera, for example, a release SW, a mode changing SW, and a power SW.

The power supply circuit 53 converts the voltage of the power supply battery 54 to a required voltage for each circuit unit of the camera and supplies the required voltage to each circuit unit. In addition, the power supply circuit 53 includes a voltage detecting circuit that detects a voltage change when a current is supplied from an external power supply and the like via a connecting terminal (not shown).

The mirror driving mechanism 18 is a mechanism for driving the quick return mirror 11 at an up position and a down position. When photographing operation is performed, the mirror driving mechanism 18 moves the quick return mirror 11 away from the optical axis O and arrange it at the up position so as to guide the luminous flux passed through the photographing lens 1 toward the CCD 31. When the optical image formed by passing through the photographing lens 1 is observed using the finder optical system, the driving mechanism 18 moves the quick return mirror 11 onto the optical axis O and arrange it at the down position.

When the quick return mirror 11 is located at the down position, the luminous flux from the photographing lens 1 is divided into a luminous flux guided toward the finder optical system via the pentaprism 12 and the like and a luminous flux guided toward the AF sensor unit 16 via the sub-mirror 11a.

The luminous flux guided to the AF sensor unit 16 via the sub-mirror 11a is received by an AF sensor in the AF sensor unit 16. Upon receiving the luminous flux, the AF sensor outputs a signal and the outputted signal is transmitted to the Bµcom 50 via the AF sensor driving circuit 17 where a well-known ranging processing is carried out.

On the other hand, the luminous flux guided to the finder optical system via the pentaprism 12 is re-formed into an image by the eyepiece 13, thereby enabling a user to observe the optical image. In addition, a part of the luminous flux guided to the finder optical system is guided to the photometric sensor 21a. Upon receiving the luminous flux, the photometric sensor 21a outputs a signal and the outputted signal is transmitted via the photometric circuit 21 to the Bµcom 50 where the well-known photometric processing is carried out.

Next, description will be made below on a simple overview of the configuration of the image pickup unit 30 in the camera with reference to FIG. 2.

The image pickup unit 30 includes: the image pickup device (CCD 31) configured by including a photoelectric conversion device such as a CCD chip 31a which receives an optical image formed by the luminous flux passed through the photographing lens 1 (not shown in FIG. 2) and irradiated on a photoelectric conversion surface and which performs photoelectric conversion processing to obtain an image signal corresponding to the optical image; the optical low-pass filter (LPF) 32 which is arranged opposed to the optical conversion surface of the CCD 31 and which removes high-frequency components from the luminous flux passed through the photographing lens 1 and irradiated on the photoelectric conversion surface of the CCD 31; the dust-proof unit configured of the dust-proof filter 33 arranged opposed to the front surface of the optical LPF 32 at a predetermined distance therefrom and the piezoelectric device 34 which is disposed on one surface in the vicinity of the periphery of the dust-proof filter 33 and which applies a predetermined vibration to the dust-proof filter 33; a fixing plate 35 for fixing a flexible printed circuit 31b on which the CCD 31 is mounted; and a main circuit substrate 36 disposed on a back surface side of the fixing plate 35.

The CCD 31 is configured of the CCD chip 31a, a flexible printed circuit 31b on which the CCD chip 31a is mounted, connecting parts 31c, 31d which are respectively extended from opposite ends of the flexible printed circuit 31b, a protection glass 31e for protecting the photoelectric conversion surface on the front surface of the CCD chip 31a, and a spacer 31f interposed between the protection glass 31e and the CCD chip 31a.

The connecting parts 31c and 31d of the flexible printed circuit 31b are connected to the connectors 36a and 36b mounted and arranged on the main circuit substrate 36, respectively. This configuration makes it possible to secure the electric connection between the CCD 31 and the flexible printed circuit 31b, and the main circuit substrate 36.

In addition, a filter receiving member 37 made of an elastic member or the like is disposed between the CCD 31 and the optical LPF 32. The filter receiving member 37 is disposed at a position on a front surface side periphery of the CCD 31 so as to avoid the effective area of the photoelectric conversion surface, and comes into contact with the vicinity of a back surface side periphery of the optical LPF 32, thereby keeping the airtightness between the CCD 31 and the optical LPF 32.

The CCD 31 and the optical LPF 32 are airtightly covered with the holder 38. The holder 38 has, at substantially the center thereof, a rectangular-shaped opening 38a for allowing the luminous flux passed through the photographing lens 1 to pass through. A stepped portion 38b that is substantially L-shaped in cross section is formed on the inner periphery of the opening 38a on the dust-proof filter 33 side. The optical LPF 32 is disposed behind the opening 38a, and the CCD 31 is disposed behind the optical LPF 32 through the filter receiving member 37. At this time, the optical LPF 32 is disposed in such a manner that a front surface side periphery thereof substantially airtightly comes into contact with the stepped portion 38b. According to this configuration, the stepped portion 38b restricts the position of the optical LPF 32 along the direction of the optical axis O, thereby preventing the optical LPF 32 from dropping out from inside of the holder 38 to the front surface side.

On the other hand, the holder 38 has, along the entire front surface side periphery thereof, a dust-proof filter receiving portion 38c formed for holding the dust-proof filter 33 in front of the optical LPF 32 at a predetermined distance from the optical LPF 32. The dust-proof filter receiving portion 38c is formed so as to protrude toward the front surface side beyond the stepped portion 38b on the outer peripheral side of the stepped portion 38b.

The dust-proof filter 33 is formed in a round or a polygonal plate-like shape as a whole. The dust-proof filter 33 is supported pressed against the dust-proof filter receiving portion 38c by a pressing member 40 made of an elastic body such as a plate spring. In this case, the pressing member 40 is fixed to a plane part on the front surface side of the dust-proof filter receiving portion 38c with a screw 39 and the like. Note that a pressing sheet 42 which is made of resin and the like and formed in a circular ring shape is sandwiched between the pressing member 40 and the dust-proof filter 33.

In addition, the piezoelectric device 34 is disposed on a back surface side outer periphery of the dust-proof filter 33, as described above. A circular sticker 41 is interposed between the piezoelectric device 34 and the dust-proof filter receiving portion 38c, thereby securing airtight state between the piezoelectric device 34 and the dust-proof filter receiving portion 38c.

The image pickup unit 30 thus includes the holder 38 which is formed in a desired size and includes the CCD 31 integrally mounted thereon, thereby providing an airtight structure between the dust-proof filter 33 and the holder 38.

Next, the image shake correction mechanism in the camera will be described.

In the present embodiment, it is supposed that the direction along the optical axis O of the photographing lens 1 is a Z-axis direction, and the CCD 31 is displaced and moved in an X-axis direction as a first direction and a Y-axis direction as a second direction which are perpendicular to each other on an XY plane perpendicular to the optical axis O, thereby compensating for the image shake. To this end, the image shake correction mechanism in the camera, that is, the anti-vibration unit using the driving apparatus for image shake correction uses an X-axis actuator (320x) and Y-axis actuator (320y) such as electromagnetic rotary motors (stepping motors and the like, for example) as driving sources for driving the driving apparatus to be described later, and the holder 38 to which the CCD 31 of the image pickup unit 30 is mounted is set as a final object to be moved.

Note that the X-axis direction, the Y-axis direction and the Z-axis direction are defined by the arrows shown in FIG. 7 and FIG. 12. Specifically, the X-axis direction and the Y-axis direction indicate the left/right direction and the up/down direction when facing the front of the camera, respectively, and the Z-axis direction indicates the direction along the optical axis O.

The configuration of the anti-vibration unit using the driving apparatus according to the present embodiment will be described below with reference to FIGS. 3 to 12.

First, the anti-vibration unit 300 sets the Y-frame 303 (holder 38) to which the CCD 31 is mounted along with the optical LPF 32, the dust-proof filter 33 and the like, as the final object to be moved in the X-axis direction and Y-axis direction.

The anti-vibration unit 300 is configured by including: the Y-frame 303 as the holder 38 to which the CCD 31 is mounted; an X-frame 301 to which the Y-frame 303 is mounted so as to be movable in the Y-axis direction; a frame 302 to which the X-frame 301 is mounted so as to be movable in the X-axis direction, the frame 302 being fixedly arranged on the camera main body side; an X-axis driving mechanism portion 310x that displaces and moves the X-frame 301 in the X-axis direction with respect to the frame 302; a Y-axis driving mechanism portion 310y that displaces and moves the Y-frame 303 (holder 38) in the Y-axis direction with respect to the X-frame 301.

According to this configuration, the Y-frame 303 (holder 38), together with the X-frame 301, is displaced and moved in the X-axis direction with respect to the frame 302 by the X-axis driving mechanism portion 310x. Meanwhile, the Y-frame 303 is displaced and moved in the Y-axis direction with respect to the X-frame 301 by the Y-axis driving mechanism portion 310y. Therefore, the CCD 31 mounted to the Y-frame 303 (holder 38) is independently displaced and moved in the X-axis direction and the Y-axis direction within the XY plane, thereby capable of compensating for the shake in the X-axis direction and the Y-axis direction.

In this case, though the detailed configuration will be described later, in the anti-vibration unit 300 as the image shake correction mechanism, the Y-frame 303 is configured integrally with a bearing 331y and a ball receiver 332y of the Y-axis driving mechanism portion 310y, and a driving portion 311y of the Y-axis driving mechanism portion 310y is configured integrally with the X-frame 301. Therefore, in the relationship between the Y-frame 303 and the X-frame 301, the Y-frame 303 (plus the bearing 331y and the ball receiver 332y) works as a movable body with respect to the X-frame 301 (plus driving portion 311y) as a fixed body.

In addition, the X-frame 301 is configured integrally with a bearing 331x and a ball receiver 332x of the X-axis driving mechanism portion 310x, and the driving portion 311x of the X-axis driving mechanism portion 310x is configured integrally with the frame 302. Therefore, in the relationship between the X-frame 301 and the frame 302, the X-frame 301 (plus the bearing 331x and the ball receiver 332x) works as a movable body with respect to the frame 302 (plus the driving portion 311x) as a fixed body.

Now, the configuration of the Y-axis driving mechanism portion 310y is described in detail. Note that the basic structure of the X-axis driving mechanism portion 310x is the same as that of the Y-axis driving mechanism portion 310y. Therefore, in the description below, only the Y-axis driving mechanism portion 310y will be detailed, and detailed description of the X-axis driving mechanism portion 310x will be omitted. In addition, the components of the Y-axis driving mechanism portion 310y are denoted by the reference numerals with suffix y, while the corresponding components of the X-axis driving mechanism portion 310x are denoted by the same reference numerals with suffix x.

The Y-axis driving mechanism portion 310y is mainly composed of two mechanism portions (units). One of the units is the driving portion 311y including the Y-axis actuator 320y such as a stepping motor as a driving source. The other of the units is a guide portion 312y for guiding the Y-frame 303 (holder 38) to smoothly displace and move the Y-frame 303 (holder 38) with respect to the X-frame 301.

First, the configuration of the driving portion 311y is described. The driving portion 311y includes: the Y-axis actuator 320y fixed with a screw and the like to a motor base 324y (see FIGS. 3, 4, 5 and the like. Illustration is omitted in FIG. 7) fixed with a screw and the like to the X-frame 301; a pinion gear 320ya fixed to a rotational axis of the Y-axis actuator 320y; a screw shaft 321y, both ends of which are rotatably supported with respect to the X-frame 301; a screw gear 321ya fixed to the screw shaft 321y and to be meshed with the pinion gear 320ya; and a nut 322y screwed with the screw shaft 321y.

One end of the screw shaft 321y is rotatably pivotably-supported in a hole portion (not shown) on the motor base 324y integrally fixed to the X-frame 301. The other end of the screw shaft 321y is rotatably pivotably-supported in a hole portion on a screw shaft plate 325y fixed to the motor base 324y with a screw and the like (see FIGS. 3, 4, 5, 7 and the like).

As shown in FIG. 11, the nut 322y is formed by including a protrusion 322yb protruding toward the X-frame 301 which is disposed behind the nut 322y. The protrusion 322yb is fitted into a groove 301a formed parallel to the screw shaft 321y on the X-frame 301 or the motor base 324y. Accordingly, the protrusion 322yb and the groove 301a are fitted to each other, thereby regulating the rotation of the nut 322y with respect to the X-frame 301.

An engaging portion 322ya of the nut 322y is engaged with a portion to be engaged 303ya of the Y-frame 303. Therefore, when the nut 322y moves in the Y-axis direction, the Y-frame 303 is displaced and moved in the same direction along with the movement of the nut 322y.

Note that a tensional tensile spring 323y (elastic means; a first elastic member) is stretched between the Y-frame 303 and the X-frame 301. The compressing force of the tensile spring 323y works so as to press the portion to be engaged 303ya of the Y-frame 303 against the engaging portion 322ya of the nut 322y. Therefore, engagement between the engaging portion 322ya of the nut 322y and the portion to be engaged 303ya of the Y frame 303, and screw fitting between the screw shaft 321y and the nut 322y are maintained without backlash.

Note that the tensile spring 323y is arranged parallel to an axis line connecting centers of guide balls 334y (a plurality of first rolling bodies) to be described later and has a biasing force in the direction along the axis line (biasing force in the compressing direction).

Here, as for the arrangement configuration of the tensile spring 323y, FIG. 3 and FIG. 7 show different arrangement configuration examples. Details of the arrangement configuration of the tensile spring 323y will be described later.

The working of the driving portion 311y according to such a configuration is as follows.

First, when the rotational axis of the Y-axis actuator 320y is rotated, the pinion gear 320ya is rotated. The pinion gear 320ya rotates the screw gear 321ya meshed therewith. The screw gear 321ya rotates the screw shaft 321y to which the screw gear 321ya is fixed.

When the screw shaft 321y is rotated, the screw shaft 321y tries to rotate the nut 322y screwed therewith. However, as described above, the nut 322 has the protrusion 322yb fitted into the groove 301a of the X-frame 301, which regulates the rotation of the nut 322 with respect to the X-frame 301.

Accordingly, when the screw shaft 321y is rotated, the nut 322y screwed with the screw shaft 321y moves in the Y-axis direction along the screw shaft 321y. Since the engaging portion 322ya of the nut 322y is engaged with the portion to be engaged 303ya of the Y frame 303 at this time, the nut 322y displaces and moves the Y frame 303 in the Y-axis direction which is a direction parallel to the screw shaft 321y (a guiding direction of a guide mechanism to be described later).

Next, the configuration of the guide portion 312y will be described.

The guide portion 312y includes: a guide 333y (a first member) having a V-groove 333ya (a first linear groove) which is linear along the Y-axis direction and has a V-shaped cross section; the bearing 331y (a second member) having a V-groove 331ya (a second linear groove) which is linear along the Y-axis direction and has a V-shaped cross section; the guide balls 334y as a plurality of (two in the present embodiment) first rolling bodies held between the V-groove 333ya of the guide 333y and the V-groove 331ya of the bearing 331y; a rectangular plate-shaped retainer 335y that defines a distance (relative position) between the two guide balls 334y; the ball receiver 332y integrally fixed with a screw and the like to the bearing 331y on a surface (front surface side) on which the V-groove 331ya is not arranged; a pressing plate 338y as a pressing member arranged opposed to the front surface side of the ball receiver 332y; balls 336y as a plurality of (three in the present embodiment) second rolling bodies held between the pressing plate 338y and the ball receiver 332y; a retainer 337y made of a predetermined polygonal-shaped plate member that defines a distance (relative position) among the plurality of balls; a plate spring 339y (pressing force applying member to be described later) as an elastic member for pressing the pressing plate 338y from the front surface side toward the ball receiver 332y with a pressing force in the Z-axis direction; two screws 341y (pressing force applying member to be described later) that fasten the plate spring 339y to the X-frame 301, and fixes the components of the guide portion 312y (unit) to the X-frame 301 in a pressing manner; and two spacers 340y (pressing force applying member to be described later) as a pair of support shafts that define a distance between the components of the guide portion 312y (unit) and the plate spring 339y.

The guide 333y is fixed on one surface (front surface side) of the X-frame 301 with two screws 312ya to be described later.

As shown in FIG. 8, the bearing 331y has a laterally extending arm portion 331yc fixed to the Y frame 303 with a screw and the like. The bearing 331y is arranged opposed to the guide 333y. In this case, the arrangement relationship between the bearing 331y and the guide 333y is described below. That is, the V-groove 331ya of the bearing 331y and the V-groove 333ya of the guide 333y are arranged opposed to each other. The two guide balls 334y are held in a region formed between the both V-grooves 331ya and 333ya, spaced by the retainer 335y a predetermined distance (at relative positions) apart from each other. In order to achieve this configuration, the retainer 335y has two holes drilled spaced a predetermined distance apart from each other. The two holes are each formed to have a size capable of accommodating the guide ball 334y.

On the other hand, on the surface of the bearing 331y which is opposite to the surface on which the V-groove 331ya is formed, that is, the front surface side of the guide portion 312y in an assembling state, the ball receiver 332y is integrally fixed with a screw and the like.

The ball receiver 332y has, as third linear grooves for guiding a plurality of balls 336y, long grooves 332ya which are formed as many as the number of the balls 336y.

In the present embodiment, three balls 336y are provided. Therefore, also three long grooves 332ya are formed. The long grooves 332ya are formed such that the longitudinal axis direction extends in the driving direction, that is, Y-axis direction. In addition, in the present embodiment, the three long grooves 332ya are arranged such that one of the three long grooves is positioned on one side with respect to a straight line connecting the centers of the two guide balls 334y (straight line extending in the Y-axis direction) and other two grooves are positioned on the other side.

The bearing 331y and the ball receiver 332y are configured as separate members in the present embodiment. However, the bearing 331y and the ball receiver 332y may be integrally configured as one member. In this case, the V-groove 331ya (the second linear groove) may be formed on one surface, and the long grooves 332ya (the third linear grooves) may be formed on the other surface.

The pressing plate 338y is arranged opposed to the front surface side of the ball receiver 332y. Three balls 336y are held between the ball receiver 332y and the pressing plate 338y, spaced by the retainer 337y a predetermined distance (at relative positions) apart from one another. In order to achieve this configuration, the retainer 337y has three holes drilled, spaced a predetermined distance apart from one another, that is, at positions corresponding to the three long grooves 332ya of the ball receiver 332y. The three holes are each formed in a size capable of accommodating the ball 336y.

Now, further description will be made on the arrangements of the three balls 336y as the plurality of second rolling bodies and the three long grooves 332ya. When the axis line connecting the centers of the guide balls 334y as the plurality of first rolling bodies is projected on the same plane on which the three balls 336y (the plurality of second rolling bodies) are arranged, that is, on the surface on the retainer 337y or the pressing plate 338y, at least one or more of the three balls 336y and at least one or more of the long grooves 332ya are arranged on both sides opposed to each other with the axis line of the guide balls 334y sandwiched therebetween within the plane (in the present embodiment, one is arranged on one side of the axis line and two are arranged on the other side). Specifically, in the examples shown in FIGS. 3, 4 and 5, two are arranged on the outer side, and one is arranged on the inner side. On the other hand, in the examples shown in FIGS. 7, 8, 9, 12, 13 and 14, one is arranged on the outer side, and two are arranged on the inner side.

Note that the long grooves 332ya (the third linear grooves) which guide the balls 336y are formed on the ball receiver 332y in the present embodiment. However, no limitation is placed on the arranging position. For example, the long grooves 332ya (the third linear grooves) may be formed on the pressing plate 338y disposed at the position opposed to the ball receiver 332y so as to sandwich the balls 336y therebetween.

The plate spring 339y has a hole 339ya formed on one end thereof and a U-shaped cutout 339yb formed on the other end thereof. In addition, the plate spring 339y includes, at a middle part thereof, raised bent projection portions 339yc which are bent backward from both sides and which have distal ends formed in a projected shape.

The hole 339ya of the plate spring 339y is formed such that a distal end side stepped portion 340ya of the spacer 340y fixed to the X-frame 301 is fitted thereinto. In addition, the U-shaped cutout 339yb of the plate spring 339y is similarly formed such that a distal end side stepped portion 340ya of the other spacer 340 is fitted thereinto.

Each of the two spacers 340y is formed in a cylindrical shape with a hollow portion, and includes the distal end side stepped portion 340ya on one end and a rear end side stepped portion 340yb on the other end. The rear end side stepped portions 340yb are fitted into the holes 333yb drilled in the vicinity of the both ends of the guide 333y, respectively.

That is, the two spacers 340y are fitted into the two holes 333yb drilled on the front surface side on the guide 333y as the first member, and implanted so as to project toward the front surface. At this time, the arrangement relationship between the two spacers 340y is such that the two spacers are arranged spaced a predetermined distance apart from each other on a straight line parallel to the V-groove 333ya as the first linear groove of the guide 333y.

In this state, the two screws 341y are inserted into the hollow portions of the spacers 340y, and the screws 341y are screwed to the screw holes formed on the X-frame 301. As a result, the plate spring 339y and the X-frame 301 are fastened to each other, and thereby the guide portion 312y is positioned and fixed with respect to the X-frame 301.

In this state, the plate spring 339y is pressed backward by head portions of the screws 341y by a predetermined amount. This causes the plate spring 339y to press the pressing plate 338y backward with a predetermined force.

Therefore, in this case, the screws 341y fix the both ends of the plate spring 339y (elastic member) to the two spacers 340y (a pair of support shafts) and serve as adjusting members for adjusting the elastic force at the time that the plate spring 339y presses the pressing plate 338y (pressing member). When the elastic force is adjusted by the screwed amount of the screws 341y, it is preferable that the spacers 340y are fixed to the guide 333y by an adhesive and the like, and after the adjustment of the elastic force, the screws 341y are also fitted to the guide 333y with an adhesive and the like.

In addition, the raised bent projection portions 339yc of the plate spring 339y are fitted into hole portions 338ya (see FIG. 5) formed on the front surface side of the pressing plate 338y. The hole portions 338ya are formed at symmetrical positions with respect to the axis line (straight line extending in the Y-axis direction) connecting the centers of the two guide balls 334y.

Accordingly, the pressing force of the plate spring 339y is applied, via the pressing plate 338y, from the front surface side to the back side, that is, in the Z-axis direction. Then, the pressing force applied to the pressing plate 338y is transmitted, via the three balls 336y, to the ball receiver 332y. As a result, the guide portion 312y is evenly pressed toward the X-frame 301, and the pressing state is maintained by the plate spring 339y.

Note that the unit composed of the plate spring 339y, the two screws 341y, the two spacers 340y and the like is referred to as a pressing force applying member that applies a pressing force to the pressing plate 338y as a pressing member.

As described above, the raised bent projection portions 339yc of the plate spring 339y are formed at symmetrical positions with respect to the axis line connecting the centers of the two guide balls 334y (the first rolling bodies). Accordingly, the pressing force applying member (the plate spring 339y) applies the pressing force such that the rotational moment around the axis line becomes zero to the three balls 336y (the plurality of second rolling bodies), via the pressing plate 338y (pressing member). It is needless to say that the three balls 336y are arranged such that the rotational moment around the axis line becomes zero.

The pressing force in the Z-axis direction is applied to the guide portion 312y of the Y-axis driving mechanism portion 310y by the plate spring 339y.

Though only the Y-axis driving mechanism portion 310y has been detailed in the description above, also the X-axis driving mechanism portion 310x has basically the same configuration and has substantially the same working. Therefore, as for the X-axis driving mechanism portion 310x, only the points different from the Y-axis driving mechanism portion 310y are described and detailed description will be omitted.

In the Y-axis driving mechanism portion 310y, the driving portion 311y is fixed to the X-frame 301. In contrast, in the X-axis driving mechanism portion 310x, the driving portion 311x is fixed to the frame 302.

In the X-axis driving mechanism portion 310x, the X-frame 301 is guided by the guide portion 312x.

In addition, the direction (Y-axis direction) in which the Y-frame 303 is guided by the Y-axis driving mechanism portion 310y and the direction (X-axis direction) in which the X-frame 301 is guided by the X-axis driving mechanism portion 310x are substantially perpendicular to each other.

Furthermore, in order to prevent the X-frame 301 from rotating around the straight line connecting the centers of the two guide balls 334x when a strong external force is applied to the guide portion 312x of the X-axis driving mechanism portion 310x, a spring 351x (second elastic member) is stretched between the X-frame 301 and the frame 302, as shown in FIG. 10.

In addition, in order to achieve smooth displacement and movement of the X-frame 301, a ball 350x is held at a predetermined position between the X-frame 301 and the frame 302, as shown in FIG. 7. The ball 350x is stored in a long groove 301b formed on the X-frame 301 and held between the X-frame 301 and the frame 302. The long side of the long groove 301b is set parallel to the direction in which the X-frame 301 is driven, that is, the X-axis direction.

Note that, as described above, as far as the tensile spring 323y is arranged so as to be stretched between the Y-frame 303 and the X-frame 301, various different arrangement may be adopted. Specifically, the arrangement configurations shown in FIG. 3 or FIG. 7 may be adopted, for example.

In the arrangement configuration shown in FIG. 3, one end of the tensile spring 323y is hooked on a projected spring hook portion 303b formed on the Y-frame 303 (holder 38). The other end of the tensile spring 323y is hooked on the stepped portion formed on the distal end part of the spacer 340y in the guide portion 312y. Note that the spacer 340y on which the other end of the tensile spring 323y is hooked may be a stepped screw formed integrally with the screw 341y, for example.

According to this configuration, the tensile spring 323y is stretched between the Y-frame 303 and the guide portion 312y on the X-frame 301.

By arranging the tensile spring 323y as such, the axis line of the tensile spring 323y overlaps the axis line connecting the centers of the two guide balls 334y in the Y-axis direction. Therefore, the pulling force by the tensile spring 323y is exerted in the direction parallel to the axis line connecting the centers of the two guide balls 334y of the guide portion 312y which guides the Y-frame 303.

According to this configuration, when the biasing force of the tensile spring 323y applied to the Y-frame 303 is exerted on the Y-frame 303, unnecessary moment (moment for causing the rotation in the XY plane) is not generated. As a result, there is an advantage that very stable driving can be secured.

Note that, also in this configuration, a moment is generated in the YZ plane including the axis line of the tensile spring 323y and the axis line connecting the centers of two guide balls 334y. In order to address this situation, the pressing force of the plate spring 339y in the Z-axis direction works to suppress the moment. The level of the pressing force of the plate spring 339y is about ten times as large as that of the biasing force of the tensile spring 323y, for example, so that the pressing force can sufficiently suppress the moment.

On the other hand, in the arrangement configuration shown in FIG. 7, one end of the tensile spring 323y is hooked on the projected spring hook portion 303b formed on the Y-frame 303 (holder 38). In addition, the other end of the tensile spring 323y is hooked on a projected spring hook portion 301c formed on the X-frame 301.

According to the configuration, the tensile spring 323y is directly stretched between the Y-frame 303 itself and the X-frame 301 itself.

According to this configuration, the tensile spring 323y can be arranged only by providing the spring hook portions 303b and 301c at predetermined parts of the frame members as needed. As a result, the initial object can be easily achieved with a simple configuration.

Furthermore, as shown in FIG. 1, the anti-vibration unit 300 includes the X-axis gyroscope 45x that detects the shake about the X-axis (shake in the pitch direction) of the body unit 100 and the Y-axis gyroscope 45y that detects the shake about the Y-axis (shake in the yaw direction) of the body unit 100. The X-axis gyroscope 45x and the Y-axis gyroscope 45y are fixed to the predetermined parts on the body unit 100.

The signals from the X-axis gyroscope 45x and the Y-axis gyroscope 45y are outputted to the anti-vibration controlling circuit 46. Upon receiving the signals, the anti-vibration controlling circuit 46 executes operation for controlling the anti-vibration driving circuit 45 according to the instruction from the Bµcom 50. Then the anti-vibration driving circuit 45 controls the Y-axis actuator 320y of the Y-axis driving mechanism portion 310y and the X-axis actuator 320x of the X-axis driving mechanism portion 310x.

The configuration described above can achieve the structure for facilitating the assembling work.

Even if the pressing force of the plate spring 339y is set to a very high level, by increasing the rigidity of the components pressed with the pressing force of the plate spring 339y, such as the bearing 331($y$, $x$), the guide 333 ($y$, $x$), the guide balls 334 ($y$, $x$), the balls 336 ($y$, $x$), and the pressing plate 338 ($y$, $x$), it is possible to prevent the components from deforming, and to precisely retain and guide the movable body (Y-frame 303 or the X-frame 301) with respect to the fixed body (the X-frame 301 or the frame 302). In addition, size-reduction of the guide portion 312 ($y$, $x$) itself can be achieved.

Furthermore, since it is unnecessary to set high rigidity for the components other than the guide portions 312($y$, $x$), that is, the components to which the pressing force of the plate springs 339($y$, $x$) is not applied, it is possible to reduce the size and weight of the entire driving apparatus.

In addition, only rolling friction is generated in the movable portions. Accordingly, even if a 10 N (Newton) pressing force is set, for example, the rolling friction force applied to the movable portions is only 0.1 N (Newton) level, for example. Therefore, the loss of driving force is very small, so that the driving force from the driving portion 311($y$, $x$) can be efficiently transmitted substantially as-is to the movable body (the Y-frame 303 or the X-frame 301).

Furthermore, in this case, even if 10 N (Newton) pressing force is applied to the bearing 331($y$, $x$), the guide portion 312($y$, $x$) can precisely retain the Y-frame 303 or the X-frame 301 to which the bearing 331($y$, $x$) is fixed. Accordingly, even when an external force (inertial force) is applied to the Y-frame 303 or the X-frame 301, for example, a strong force to restore it to the original state is generated. Therefore, the movable body can be stably retained. In the specific examples (FIG. 13, FIG. 14) shown below, though only the guide portion 312y of the Y-axis driving mechanism portion 310y is described, the configuration and the working of the X-axis driving mechanism portion 310x are substantially the same as those of the Y-axis driving mechanism portion 310y.

For example, in the state shown in FIG. 13, that is, in the normal state where external force is not applied to the guide portion 312y, the pressing force of the plate spring 339y evenly works in the Y-axis direction with respect to the two raised bent projection portions 339yc formed at the middle part of the plate spring 339y. That is, the pressing force of the plate spring 339y in this case is shown by the arrows X1, X2 in FIG. 13. Furthermore, the pressing force of the plate spring 339y applied to the bearing 331y through the three balls 336y is shown by the arrows X3, X4 and X5 in FIG. 13. In this case, the pressing force shown by the arrow X1 works evenly on the two balls 336y located on the inner side. Therefore, X3 is equal to X4. In addition, the pressing force shown by the arrow X2 works on the one ball 336y located on the outer side. The relationship among the pressing force amounts is shown by the equation below.

$$X1+X2=X3+X4+X5$$

According to the relationship, both sides opposed to each other with the axis line connecting the centers of the two guide balls 334y (shown with the reference numeral J in FIG. 13) sandwiched therebetween are balanced against each other.

In this case, when the distances from the axis line J to the centers of the balls 336y are defined as L1 and L2, the relationship expressed by the following equation is established.

$$X3 \cdot L1 + X4 \cdot L1 = X5 \cdot L2$$

Therefore, the moment with respect to the axis line J becomes zero. This enables the guide portion 312y to be stable in the state shown in FIG. 13.

When the guide portion 312 is in the state shown in FIG. 13, if an external force (the arrow Xg) shown in FIG. 14 is applied to the Y-frame 303 as the movable body, for example, a twisting force R1 works on the plate spring 339y as shown in FIG. 14. Then, a force in a direction to cancel the twisting force R1 is generated in the plate spring 339y. As a result, pressing forces X1a, X2a which are different in the Y-axis direction are applied to the two raised bent projection portions 339yc, respectively.

That is, when an external force is applied to the Y-frame 303 and the Y-frame 303 becomes the state shown in FIG. 14, a moment to bring the state back into the state shown in FIG. 13 is generated in the plate spring 339y. In this case, when the relationship among the pressing force amounts shown by the following equation is established, the stable state is maintained.

$$X1a+X2a=X3a+X4a+X5a$$

At this time, when the distances from the axis line J to the centers of the balls $336y$ are defined as L1 and L2, and the distance from the axis line J to the external force application point is defined as Lg, the relationship expressed by the following equation is established.

$$X3a \cdot L1 + X4a \cdot L1 = X5 \cdot L2 + Xg \cdot Lg$$

Accordingly, the moment with respect to the axis line J becomes zero.

According to the configuration of the present embodiment, even when an external force (inertial force) is exerted on the movable body, it is possible to easily restore the movable body to the original state.

Note that the bearing $331(y, x)$, the guide $333(y, x)$ and the pressing plate $338(y, x)$ which are included in the guide portion $312(y, x)$ tend to be deformed or abraded, because the guide balls $334(y, x)$ or the balls $336(y, x)$ are pressed and contact. In order to prevent such deformation or abrasion, the guide balls $334(y, x)$ or the balls $336(y, x)$ made of a material that can be quenched, such as quenched ferritic stainless steel, for example, may be used to increase the rigidity and abrasion resistance.

Furthermore, when a strong external force is exerted on the movable body, it is considered that a rotational force around the axis line connecting the centers of the two guide balls $334(y, x)$ is applied to the bearing $331(y, x)$ of the guide portion $312(y, x)$.

In order to suppress the rotational force, the long groove ($303a$, $301b$) is arranged at a position apart from the guide portion $312(y, x)$ to which the movable body (the Y-frame 303 or the X-frame 301) is integrally fixed, to hold the balls 350 (y, x) between the long groove ($303a$, $301b$) and the fixed body (the X-frame 301 or the frame 302), and the spring $351(y, x)$ stretched between the movable body and the fixed body is arranged in the vicinity of the ball $350(y, x)$.

According to this configuration, the rotation of the bearing $331(y, x)$ can be suppressed without a strong tensile force of the spring $351(y, x)$. In addition, a large moment of the plate spring $339(y, x)$ is exerted on the movable body (the Y-frame 303 or the X-frame 301), so that it is possible to easily remove the influence of the external force with little increase in the driving load.

Note that a roller member as a rolling body may be used instead of each of the balls (334, 336 and 350).

The image shake correction operation by the camera equipped with the driving apparatus of the present embodiment will be described below.

When a shake correction SW (not shown) of the camera operation SW 52 is on-state, if the main SW is turned on, a signal for causing the anti-vibration driving circuit 45 to perform initial operation is transmitted to the anti-vibration controlling circuit 46 from the Bµcom 50. In response to the signal, a predetermined pulse voltage is applied from the anti-vibration driving circuit 45 to the X-axis actuator $320x$ for X-axis driving and the Y-axis actuator $320y$ for Y-axis driving. According to the application of the pulse voltage, the X-frame 301 and the Y-frame 303 (holder 38) are driven in the X-axis direction and the Y-axis direction such that the center of the CCD 31 is positioned on the optical axis O.

It is the same as described above that the X-axis actuator $320x$ and the Y-axis actuator $320y$ are stepping motors. In addition, the camera is not equipped with an absolute position detecting apparatus, but includes a mechanism capable of detecting only the initial position. Furthermore, the number of pulses, which are required for driving to move the CCD 31 located at the initial position and arrange the center of the CCD31 on the optical axis O, are stored as data for the X-axis and the Y-axis in the nonvolatile memory 29 (EEPROM). Accordingly, the data is used for the above-described control, that is, the driving control to move the CCD 31 onto the optical axis O.

Shake signals of the body unit 100 which are detected by the X-axis gyroscope $45x$ and the Y-axis gyroscope $45y$ are captured in the anti-vibration controlling circuit 46.

In the X-axis gyroscope $45x$ and the Y-axis gyroscope $45y$, the output signals from the angular velocity sensors for detecting the shake about the corresponding axes are amplified in the processing circuit, and thereafter A/D converted and inputted to the anti-vibration controlling circuit 46.

The anti-vibration controlling circuit 46 calculates the shake correction amount based on the output signals from the X-axis gyroscope $45x$ and the Y-axis gyroscope $45y$. In accordance with the shake correction amount thus calculated, the Y-frame 303 (holder 38) to which the CCD 31 is mounted and the X-frame 301 are driven by the X-axis actuator $320x$ for X-axis driving and the Y-axis actuator $320y$ for Y-axis driving which are operated in response to the instruction signal from the anti-vibration driving circuit 45.

That is, in the anti-vibration controlling circuit 46, a reference value is calculated based on the signals (hereinafter referred to as "shake signals" or "shake angular velocity signals") inputted from the X-axis gyroscope $45x$ and the Y-axis gyroscope $45y$.

The calculation of the reference value is continuously performed during the period from the power-on operation of the main power supply of the camera to execution of exposure operation for still-image photographing. The method of reference value calculation includes a method of calculating a moving average value of shake signals for a relatively long time period, a method of calculating DC components by using a low-pass filter, the cut-off frequency of which is relatively low, or the like, and any one of such methods may be used.

By calculating the difference between the reference value obtained by the calculation and the shake signal, a signal from which the low-frequency components of the shake signal is removed can be obtained. Then the anti-vibration driving circuit 45 is controlled based on the signal, thereby moving the position of the CCD 31 (Y-frame 303 (holder 38)) so as to compensate for the image shake.

Now the image shake correction operation at the time of still image photographing is described with reference to the flowchart in FIG. 15. Note that the image shake correction operation is not performed before instruction to start the photographing preparation is given through the release SW (before a first release is turned on (1R-ON)). When the instruction to start the photographing preparation is given through the release SW (the first release is turned on (1R-ON)), the image shake correction operation is started.

When the operation is started, the correction amount is calculated based on the above-described reference value, and the image shake correction driving is started according to the calculated correction amount (step S11).

Subsequently, it is determined whether or not the instruction to start the photographing preparation has been canceled through the release SW (a first release has been turned off (1R-OFF)) (step S12).

When the instruction has been canceled (step S12; branching to "YES"), the image shake correction driving started in step S11 is stopped and operation for centering the CCD 31 is performed (step S17). After that, the operation will be in an instruction waiting state of the photographing preparation start (first release (1R) waiting state).

On the other hand, when the instruction to start the photographing preparation is not canceled (step S12; branching to NO), it is subsequently determined whether or not the instruction to start photographing has been given through the release SW (second release has been turned on (2R-ON)) (step S13).

When the instruction to start photographing is not given (step S13; branching to NO), the operation returns to step S12 to be in the instruction waiting state.

When the instruction to start photographing has been given through the release SW (step S13; branching to YES), the image shake correction driving started in step S11 is stopped and the operation for centering the CCD 31 is executed (step S14).

Subsequently, a correction amount is calculated by using the retained reference value, and the image shake correction driving is started according to the correction amount (step S15).

Then exposure operation by the photographing operation is performed (step S16).

When the exposure operation is completed, the image shake correction driving is stopped and the operation for centering the CCD 31 is executed (step S17). After that, the operation will be in the instruction waiting state of the photographing preparation start (first release (1R) waiting state).

As described above, according to the above-described embodiment, the V-groove for guiding is arranged both on the fixed body side and the movable body side and at least two guide balls are arranged between the V-grooves, thereby reducing the frictional loss of the guide portion. In addition, other balls are arranged on a surface which is opposite side of the V-groove on the movable body so as to be located at positions facing each other with the axis line forming the V-groove sandwiched therebetween, and these other balls are pressed by the pressing member in the Y-axis direction, thereby extremely reducing the frictional loss of the pressing mechanism side of the movable body. Furthermore, it is possible to stably press the movable body with a large pressing force (the pressing force can be set at a level several tens of times to one-hundred times larger than the driving force), so that it is possible to prevent the backlash from occurring in the guide portion for guiding the movable body and to support and guide the movable body side with respect to the fixed body side with one axis. Therefore, precise driving can be stably performed with a simple configuration, which results in a size reduction of the driving apparatus.

In addition, a rotary motor and the like can be used without limiting a kind of actuator for driving the movable body, thereby realizing a simpler driving mechanism. Therefore it is possible to reduce the size and weight of the driving apparatus with a reduced cost.

In addition to these effects, the present invention can achieve high efficiency and high precision of the entire driving apparatus while reducing the cost as well as the size and weight of the apparatus.

It is needless to say that the present invention is not limited to the above-described embodiment, and various changes and modifications are possible without changing the scope of the present invention. Furthermore, the above-described embodiment includes inventions of various stages, and by combining a plurality of constituent components disclosed in the embodiment as needed, inventions of various stages can also be extracted. For example, even if some constituent components are deleted from all the constituent components shown in the above-described present embodiment, if the problem to be solved by the invention can be solved and the effects of the invention can be obtained, the configuration in which some constituent components are deleted can be extracted as an invention. The present invention is not limited by specific embodiments but is defined by appended claims.

What is claimed is:

1. A driving apparatus for moving a movable body with a driving force of a driving source, comprising:
   a first member including a first linear groove;
   a second member including a second linear groove on one surface opposed to the first linear groove, the second member being arranged so as to be movable with respect to the first member;
   a plurality of first rolling bodies which are held between the first linear groove and the second linear groove and which are linearly arranged spaced a predetermined distance apart from one another;
   a pressing member for pressing the first member and the second member from a direction perpendicular to an axis line connecting centers of the plurality of first rolling bodies;
   a pressing force applying member for applying a pressing force to the pressing member; and
   a plurality of second rolling bodies arranged spaced at a predetermined distance apart from one another on the same plane, between the second member and the pressing member,
   wherein a plurality of third linear grooves for guiding the plurality of second rolling bodies are formed on either one of the second member or the pressing member,
   the plurality of second rolling bodies are arranged such that, when an axis line connecting the centers of the plurality of first rolling bodies is projected on a plane which is the same plane on which the plurality of second rolling bodies are arranged, at least one or more of the plurality of second rolling bodies are located on both sides opposed to each other with the axis line sandwiched therebetween within the plane, and
   the pressing force applying member applies a pressing force to the plurality of second rolling bodies through the pressing member such that a rotational moment around the axis line becomes zero.

2. The driving apparatus according to claim 1, wherein the pressing force applying member includes:
   a pair of support shafts arranged spaced at a predetermined distance apart from each other on the first member so as to be located on a straight line parallel to the first linear groove;
   an elastic member for pressing the pressing member; and
   an adjusting member for fixing the elastic member to the pair of support shafts and adjusting an elastic force to press the pressing member by the elastic member.

3. The driving apparatus according to claim 1, further comprising
   elastic means for biasing the second member to the first member, wherein
   the elastic means includes: a first elastic member which is arranged parallel to the axis line connecting the centers of the plurality of first rolling bodies and which has a biasing force in a direction along the axis line; and a second elastic member which has a biasing force in a direction coincident with a direction in which the pressing member is pressed by the pressing force applying member.

4. An image pickup apparatus including the driving apparatus according to claim 1.

5. An image pickup apparatus including the driving apparatus according to claim 2.

6. An image pickup apparatus including the driving apparatus according to claim 3.

* * * * *